United States Patent [19]

Staerzl

[11] Patent Number: 4,712,527

[45] Date of Patent: Dec. 15, 1987

[54] ENGINE IDLE STABILIZATION TIMING CIRCUIT

[75] Inventor: Richard E. Staerzl, Fond du Lac, Wis.

[73] Assignee: Brunswick Corporation, Skokie, Ill.

[21] Appl. No.: 866,163

[22] Filed: May 22, 1986

[51] Int. Cl.⁴ ............................................. F02P 5/145
[52] U.S. Cl. .................................. 123/418; 123/421; 123/422; 123/424; 123/427
[58] Field of Search ............... 123/418, 421, 422, 424, 123/427

[56] References Cited

U.S. PATENT DOCUMENTS

| 3,867,916 | 2/1975 | Bigalke | 123/418 |
| 4,066,968 | 1/1978 | Guipaud | 123/418 |
| 4,111,174 | 9/1978 | Fitzner et al. | 123/418 |
| 4,232,642 | 11/1980 | Yamaguchi et al. | 123/422 |
| 4,421,085 | 12/1983 | Nagase et al. | 123/421 |

FOREIGN PATENT DOCUMENTS

| 3326278 | 1/1985 | Fed. Rep. of Germany | 123/418 |
| 779616 | 11/1980 | U.S.S.R. | 123/418 |

Primary Examiner—Andrew M. Dolinar

Attorney, Agent, or Firm—Andrus, Sceales, Starke & Sawall

[57] ABSTRACT

A timing circuit is provided for stabilizing idling of an internal combustion engine, particularly marine racing applications where idle speed must be reduced to enable gear engagement, notwithstanding the use of a racing cam otherwise requiring higher idling speed. Delay means (8) provides a radical reduction in spark timing along a negative slope (16) relative to a baseline curve (6) up to a predetermined speed such as 900 rpm at which there is maximum relative timing delay (18). As speed increases in this range, there is more retard because of the negative slope, which further retarded timing slows engine speed, hence providing self-stabilization. As engine speed decreases in such range, there is less retard, and the advanced timing increases engine speed, again providing self-stabilization. At engine speed increases above the predetermined speed such as 900 rpm, there is a rapid advance in timing along a steeper positive slope (20) to merge with the baseline curve (6). Cranking and warm-up control circuitry (12) and acceleration detection circuitry (14) are also provided for eliminating or reducing the relative timing delay under conditions where maximum spark advance is desired.

6 Claims, 3 Drawing Figures

ENGINE IDLE STABILIZATION TIMING CIRCUIT

BACKGROUND AND SUMMARY

The invention arose during development efforts in marine racing applications. A high performance or racing cam shaft requires a higher than normal idle speed, e.g., 1,200 rpm. However, marine transmissions typically require a lower idle speed, e.g., 600 rpm, in order to shift into gear. When the racing engine is attempted to be idled at 600 rpm, it breaks into severe oscillation, with idle speed varying between 400 and 1,200 rpm, and finally not idling at all.

The present invention addresses and solves the above noted problem by controlling spark timing, including a radical reduction in spark timing from a normal 10° before top dead center to 15°-20° after top dead center and by providing a negative slope timing curve for self-stabilization. As engine speed increases, so does the amount of retard, which in turn reduces engine speed and thus stabilizes same. Likewise, as engine speed decreases, the amount of retard decreases and advances engine timing to thus increase engine speed, again providing stabilization. A smooth idle around 600 rpm is achieved. At engine speeds above a predetermined value, e.g., 900 rpm, the timing curve transitions to a positive slope and at a steeper rate to quickly advance engine timing and merge with a baseline timing curve.

The timing delay of ignition pulses relative to a top dead center position of the engine increases with increasing engine speed along a negative slope to a maximum delay at a predetermined engine speed, e.g., 900 rpm, and the relative timing delay then decreases along a steeper positive slope at higher engine speeds to merge with the baseline timing curve.

An engine temperature sensitive circuit is provided to reduce the retard and advance engine timing to the baseline curve when the engine is cold, and to retard the relative engine timing from the baseline curve at idle after the engine reaches a given temperature. A starting circuit is included to reduce the retard and advance the engine timing during cranking regardless of engine temperature. An acceleration detection circuit senses throttle position and quickly advances engine timing to eliminate the retard and enable quick acceleration when called for by throttle advancement. A disabling circuit disables the acceleration detection circuit at high engine speeds so that engine timing follows only the baseline curve.

DETAILED DESCRIPTION

Figure 1:
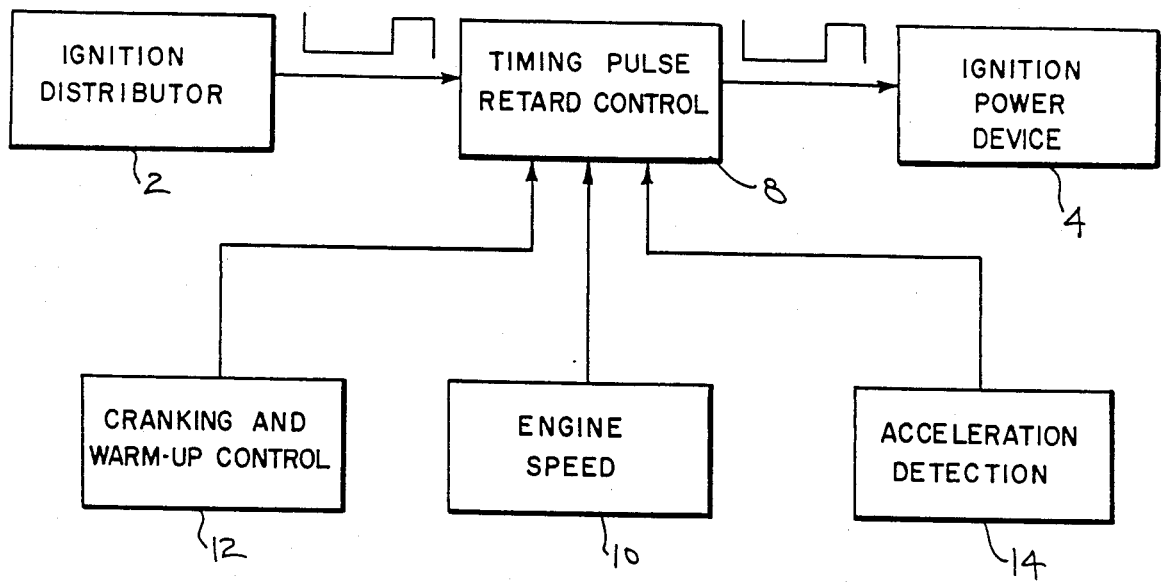
FIG. 1 is a schematic block diagram of an engine idle stabilization timing circuit in accordance with the invention.
Figure 2:
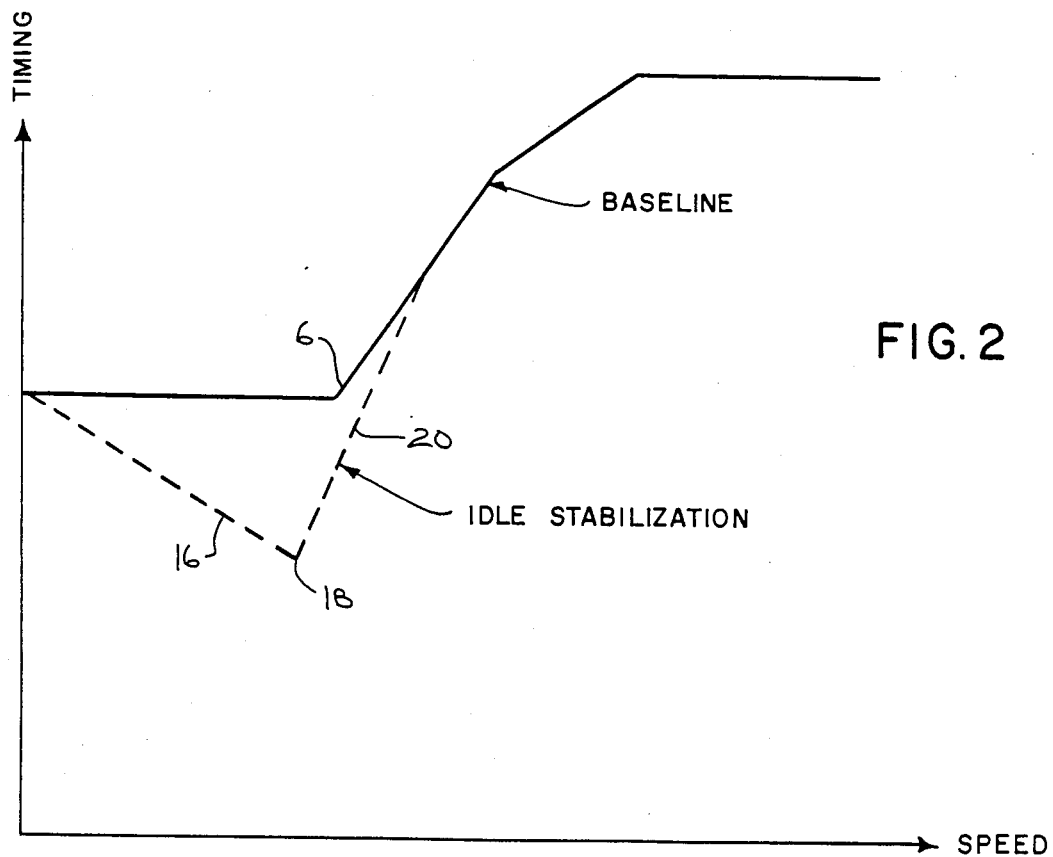
FIG. 2 is a graph of engine speed as the abscissa versus relative timing advancement as the ordinate illustrating operation of the invention.

FIG. 1 shows an ignition distributor 2 supplying ignition pulses to an ignition power device 4 which in turn supplies the ignition timing pulses according to a baseline timing curve, FIG. 2, for controlling spark ignition in an internal combustion engine. FIG. 2 illustrates timing advancement as a function of engine speed and illustrates baseline timing curve 6. This baseline timing curve is typically pre-programmed into ignition power device 4, for example the Dolphin ignition system in Mercury Marine racing applications, Mercury Marine Part No. 390-7804-1.

In the present invention, the ignition timing pulses either into or out of ignition power device 4 are variably delayed in order to provide idle stabilization. In FIG. 1, the ignition timing pulses are delayed by a timing pulse retard control circuit 8 providing a variable delay according to an engine speed responsive circuit 10. Cranking and warm-up control circuitry 12 and acceleration detection circuitry 14 are also provided, to be more fully described.

In the preferred embodiment, at engine speeds up to about 900 rpm, FIG. 2, the ignition timing pulses are variably delayed relative to a top dead center position of the engine to retard engine timing from baseline curve 6. The relative timing delay increases with increasing engine speed as shown along dashed line negative slope 16. The relative timing delay is at a maximum at inflexion point 18 at 900 rpm engine speed. The relative timing delay thus increases with increasing engine speed up to such predetermined speed. At engine speeds higher than 900 rpm, the relative timing delay decreases with increasing engine speed along positive dashed line slope 20 which is steeper than negative slope 16. The decreasing relative timing delay along steep slope 20 merges with the baseline timing curve 6 at about 2,200 rpm, the steep slope 20 providing a gradual merging transition with the baseline timing curve to eliminate surging.

Idle stabilization is provided as follows. At speeds below 900 rpm, e.g., 600 rpm, an increase in engine speed increases the relative timing delay, i.e., rightwardly downwardly along negative slope 16, which increased delay further retards engine timing, which further retarded timing slows engine speed, hence providing self-stabilization. Likewise, a decrease in engine speed decreases the relative timing delay, i.e., leftwardly upwardly along negative slope 16, and thus advances engine timing, which advanced timing increases engine speed, hence providing self-stabilization. As above noted, the rate of delay increase with increasing engine speed up to the predetermined 900 rpm speed is less than the rate of delay decrease with increasing engine speed above the predetermined 900 rpm speed such that the slope 20 of the latter is steeper than the slope 16 of the former, with the slopes meeting at the maximum delay 18 corresponding to the predetermined 900 rpm speed.

Timed ignition is provided relative to a top dead center position in a cycle of revolution of the engine. In the preferred embodiment, the idle stabilization circuitry delays the ignition pulses by a fixed absolute time interval up to a predetermined engine speed such as 900 rpm. Such fixed absolute time interval becomes a greater percentage of the time needed for the engine to complete a cycle of revolution as engine speed increases up to the predetermined speed. That is, at low engine speeds, the period or time for one revolution is greater, and the fixed delay interval is a small fraction thereof. As engine speed increases, the period or time for a revolution is smaller, and the fixed delay interval becomes a greater fraction thereof. Hence, the fixed absolute time delay interval becomes a greater number of degrees after top dead center as engine speed increases. Thus, the delay of the ignition timing pulses relative to the top dead center position increases along negative slope 16 with increasing engine speed up to the predetermined speed, to increasingly retard engine timing from the baseline curve to a maximum delay at transition point 18 at the predetermined speed. At speeds above the predetermined speed, the absolute time interval of delay is decreased with increasing engine speed to decrease delay of ignition timing pulses relative to the top dead center position, to advance engine timing along slope 20 to merge with the baseline curve.

Figure 3:
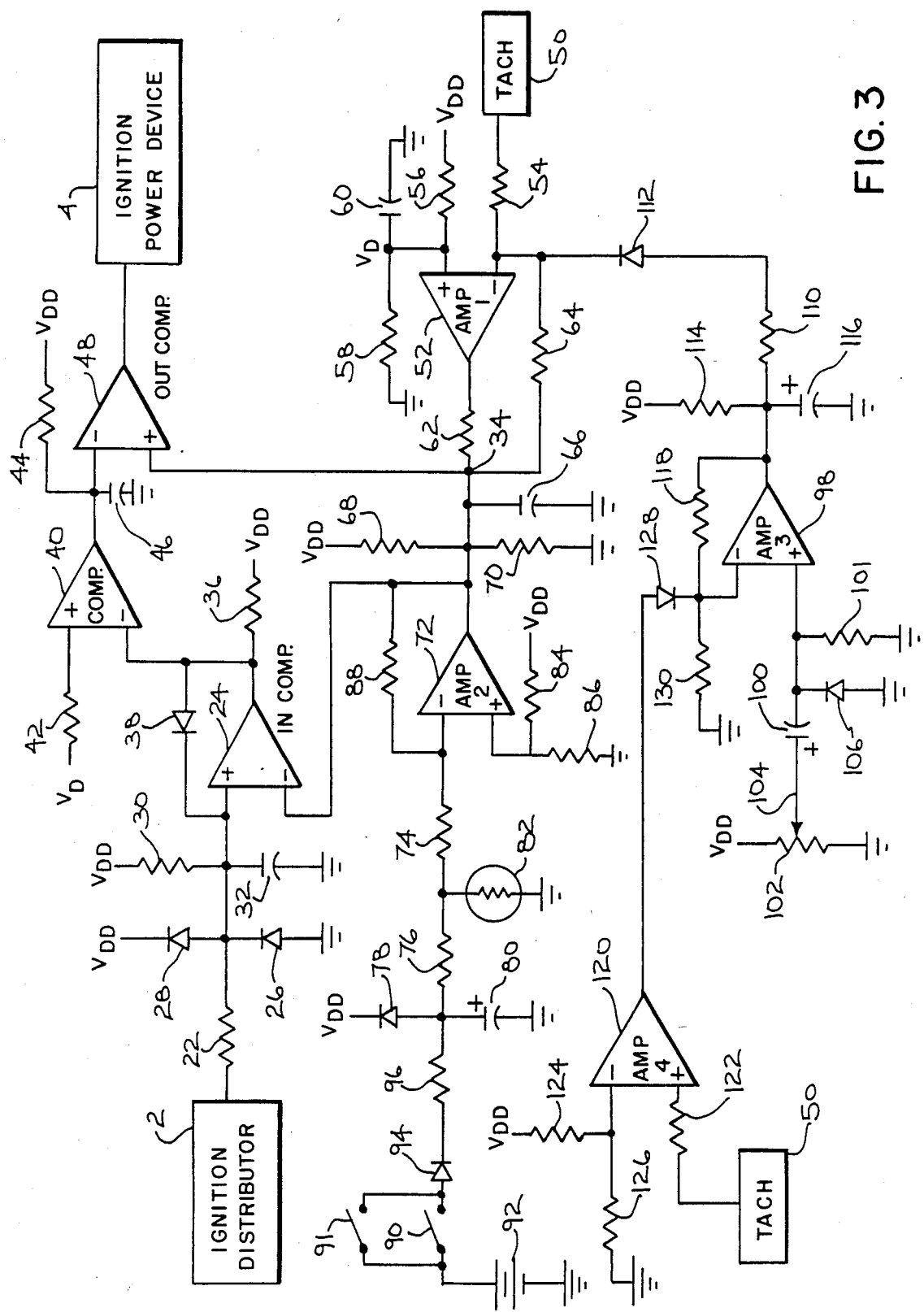
FIG. 3 is a circuit diagram of the invention.

Referring to FIG. 3, ignition pulses from distributor 2 are supplied through resistor 22 to the plus input as a comparison input of comparator 24. A pair of diodes 26 and 28 are provided in series between ground and a fixed voltage source $V_{DD}$ and provide voltage clipping and noise suppression. Resistor 30 and capacitor 32 provide an RC timing circuit. The minus input of comparator 24 is used as the reference voltage input and is connected to node 34. The output of comparator 24 is tied through resistor 36 to the voltage supply $V_{DD}$ and is also fed back through diode 38 to provide positive switching of comparator 24. When the incoming ignition pulse from distributor 2 is low, capacitor 32 discharges through resistor 22. When the incoming ignition pulse transitions high at a leading edge, capacitor 32 can no longer discharge through resistor 22 and instead is charged from $V_{DD}$ through resistor 30. When the voltage at the comparison plus input of comparator 24 rises above the voltage at the minus reference input, or above a given threshold value relative thereto, the output of comparator 24 goes high. The leading edge of the ignition timing pulse is delayed by the RC time constant of RC timing circuit 30, 32.

The output of comparator 24 is connected to the minus input as a comparison input of intermediate comparator 40. The plus input of comparator 40 is used as the reference input and is connected through resistor 42 to a voltage supply $V_D$ which is less than $V_{DD}$ and is obtained from voltage divider network 56, 58, to be described. When the output of comparator 24 goes high, such high state at the minus input of comparator 40 causes the output of comparator 40 to go low. Resistor 44 and capacitor 46 connected between the voltage supply and ground provide a second RC timing circuit. Capacitor 46 is discharged by the low state of the output of comparator 40.

The output of comparator 40 is connected to the minus input as a comparing input of an output comparator 48. The plus input of comparator 48 is used as the reference input and is connected to node 34. When the output of intermediate comparator 40 goes low and discharges capacitor 46, the voltage at the minus input of comparator 48 drops below the voltage at the reference plus input, or lower than a given threshold value relative thereto, and the output of comparator 48 goes high. The output of comparator 48 is connected to the igniton power device 4, for example the above noted Dolphin ignition system in a Mercury Marine Merc Cruiser line. The leading positive-going edge of the ignition pulse from distributor 2 has thus been processed through input comparator 24, intermediate comparator 40 and output comparator 48 to provide a leading positive-going ignition pulse edge to ignition power device 4 which has been delayed by RC timing circuit 30, 32.

When the ignition pulse from distributor 2 transitions low at its trailing edge, such low state discharges capacitor 32 substantially instantaneously through resistor 22. This low state causes the voltage at the comparing plus input of comparator 24 to drop below the voltage at the minus reference input from node 34, or below a given threshold value relative thereto, and the output of comparator 24 goes low. This low state presents a low voltage at the minus comparing input of comparator 40 less than the voltage at the reference plus input, or less than a given threshold value relative thereto, and the output of comparator 40 thus goes high. The high state of the output of comparator 40 prevents capacitor 46 from discharging, and capacitor 46 instead is charged by the voltage supply through resistor 44. The charging time of capacitor 46 delays the rise in voltage at the minus comparing input of comparator 48, as determined by the RC time constant, and when such voltage increases above the voltage at the plus reference input, or above a given threshold value relative thereto, the output of comparator 48 transitions low. Hence, the negative-going trailing edge of the ignition pulse from distributor 2 has been processed through the comparators and then output to ignition power device 4 as a trailing edge delayed by RC timing circuit 44, 46.

The amount of delay of the leading and trailing edges of the ignition pulses is determined by the voltage at reference node 34. The lower the voltage at node 34, the less the delay. A low voltage at reference node 34 presents a low voltage at the minus reference input of comparator 24, which in turn means that the voltage at the plus comparison input of comparator 24 does not have to rise as high until it reaches the voltage at the minus reference input, or a given threshold value relative thereto, hence causing the output of comparator 24 to transition high. Likewise, a low reference voltage at the plus reference input of output comparator 48 means that the voltage at the minus comparison input of comparator 48 does not have to rise as high to reach the voltage at the plus reference input, or a given threshold value relative thereto, thus causing the output of comparator 48 to transition sooner. Increasing the voltage at node 34 increases the reference input voltage to the input and output comparators 24 and 48 which in turn requires a longer time delay before the respective capacitors 32 and 46 are charged to the switching threshold value for the respective comparator, hence increasing the delay of the respective leading and trailing edge of the ignition pulse. Thus, the lower the voltage at node 34, the more advanced the spark timing, and vice versa.

An engine speed responsive circuit is provided by a tachometer 50 outputting a DC voltage as a function of engine speed and a differential amplifier 52 receiving the speed responsive voltage through resistor 54 at its minus input as a comparison input. The plus input of differential amplifier 52 is used as the reference input and is connected to the voltage supply through the voltage divider network provided by resistors 56 and 58 and filtered by capacitor 60. The output of differential amplifier 52 is connected through resistor 62 to node 34 and through feedback resistor 64 to its minus input for controlling the gain. In the preferred embodiment, the offset of the differential amplifier is set so that the tachometer signal does not come into play until about 900 rpm. The output of differential amplifier 52 is normally high when the engine speed is below 900 rpm and the tach voltage at the minus comparing input of differential amplifier 52 is less than the reference voltage at the plus reference input of differential amplifier 52.

The normally high state at the output of differential amplifier 52 prevents capacitor 66 from discharging such that a normally high voltage appears at node 34 set by the voltage divider network provided by resistors 68 and 70. This normally high set voltage provides a fixed reference voltage to the reference inputs of comparators 24 and 48 to provide the above noted fixed absolute time interval of delay of the leading and trailing edges of the ignition pulse.

When the engine speed exceeds 900 rpm, the voltage at the minus comparing input of differential amplifier 52 rises above the voltage at the plus reference input of differential amplifier 52, or above a given threshold value relative thereto, and the output of differential amplifier 52 goes low. This low state of the output of differential amplifier 52 sinks current from capacitor 66, thus reducing the voltage at node 34, hence reducing the relative timing delay of the ignition pulses and advancing engine timing. The output of differential amplifier 52 rapidly goes low to provide the steep slope 20 in FIG. 2. The steeper the slope, the more gradual the merger with the baseline timing curve, and hence the gain of differential amplifier 52 is set accordingly. Zero voltage at node 34 means no relative timing delay and hence the engine timing follows the baseline curve 6.

A second differential amplifier 72 has its minus input as the comparison input connected through resistors 74 and 76 and voltage clipping diode 78 to the voltage supply. A capacitor 80 is connected between ground and the junction of diode 78 and resistor 76. A temperature responsive element 82, such as a negative temperature coefficient thermistor sensing engine temperature, is connected between ground and the junction of resistors 74 and 76. The plus input of differential amplifier 72 is used as the reference input and is connected to the voltage supply through the voltage divider network provided by resistors 84 and 86. The output of differential amplifier 72 is connected to node 34 and also fed back through resistor 88 to the minus input to control gain. When the engine is cold, the resistance of thermistor 82 is high, and the voltage thereacross is high as provided by the voltage divider network provided by resistor 76 and the resistance of thermistor 82, which high state at the minus comparing input of differential amplifier 72 causes the output of differential amplifier 72 to be low. This low state sinks current and discharges capacitor 66 such that node 34 is low, hence providing little or no relative timing delay, and advancing engine timing to the baseline curve. Maximum spark advance is thus provided during warm-up.

As the engine warms up, and its temperature increases above a given value, the resistance of thermistor 82 decreases, which reduces the voltage thereacross, and hence reduces the voltage at the minus comparing input of differential amplifier 72. When the voltage at the minus comparing input of differential amplifier 72 drops below the reference voltage at the plus reference input of differential amplifier 72, or below a given threshold value relative thereto, the output of differential amplifier 72 goes high. This high state at the output of differential amplifier 72 prevents discharge of capacitor 66, and hence increases the voltage at node 34, which in turn provides the above noted relative timing delay along slopes 16 and 20, FIG. 2, as controlled by differential amplifier 52 according to engine speed. Capacitor 80 provides a gradual transition from advanced to retarded timing when the voltage signal at diode 94 is removed either by the thermostatic switch 90 or start switch 91. Capacitor 80 discharges slowly through thermistor 82, and during such slow discharge, capacitor 80 holds up the voltage at the minus comparing input of differential amplifier 72, to in turn provide a slow gradual transition of the output of differential amplifier 72.

During cranking, when starter switch 91 is manually closed by the operator, starting voltage, for example from a starting battery 92, is supplied through diode 94 and resistor 96 and then through resistors 76 and 74 to the minus comparing input of differential amplifier 72 to thus provide a high state thereat whereby the output of differential amplifier 72 is low and hence node 34 is low, and hence maximum spark advance is provided during cranking, regardless of engine temperature. Thermostatic switch 90 is responsive to engine temperature and is closed when the engine is cold to thus complete a circuit from battery 92 and provide maximum spark advance. Thermostatic swtich 90 opens when the engine temperature rises above a given level, to enable the above noted retard. In the preferred embodiment, thermistor 82 is selected such that its low resistance state does not sufficiently decrease the starting voltage at the minus comparing input of differential amplifier 72 below that at the plus reference input, or below a given threshold value relative thereto, such that even if the engine is cranked for restart when hot, maximum spark advance is still provided during such restart cranking.

A third differential amplifier 98 has a plus comparing input connected through a differentiating network, provided by capacitor 100 and resistor 101, to a throttle position sensor 102 in the form of a potentiometer connected to the supply voltage. When the throttle is advanced to accelerate the engine, wiper arm 104 of the potentiometer moves upwardly such that the divided voltage thereat increases. Diode 106 provides clipping and protection. The minus input of differential amplifier 98 is used as the reference input and is connected to a reference voltage source which is low below a given elevated engine speed, to be described. The output of differential amplifier 98 is connected through resistor 110 and diode 112 to the minus comparing input of differential amplifier 52, and is also tied to the voltage supply through resistor 114 and filtered by capacitor 116, and is also fed back through resistor 118 to the minus input to control gain. In response to throttle advance calling for rapid acceleration, wiper arm 104 moves upwardly and the voltage at the plus comparing input of differential amplifier 98 rises rapidly above the reference voltage at the minus reference input, or above a given threshold value relative thereto, and the output of differential amplifier 98 rises, whereby the minus comparing input of differential amplifier 52 rises in voltage level, and hence the output of differential amplifier 52 at node 34 goes low, which in turn reduces the relative timing delay and advances the timing to enable quick acceleration.

The acceleration detection and timing advance is disabled above another higher predetermined engine speed, e.g., 3,500 rpm where there is no need for such circuit or its retard or advance. A fourth differential amplifier 120 has its plus comparing input connected through resistor 122 to tachometer 50. The minus input of differential amplifier 120 is used as the reference input and is connected to the voltage supply through the voltage divider network provided by resistors 124 and 126. The offset is selected so that the tach voltage does not come into play until about 3,500 rpm in the preferred embodiment. At engine speeds below 3,500 rpm, the voltage at the plus comparing input of differential amplifier 120 is below the voltage at the minus reference input of differential amplifier 120, or lower than a given threshold value relative thereto, and the output of differential amplifier 120 is low. The output of differential amplifier 120 is connected through diode 128 to the minus reference input of differential amplifier 98, and includes a bias resistor 130. The minus reference input of differential amplifier 98 is thus low at engine speeds below 3,500 rpm. When the engine speed increases above 3,500 rpm, the voltage at the plus comparing input of differential amplifier 120 rises above the voltage at the minus reference input of differential amplifier 120, or above a given threshold value relative thereto, whereby the output of differential amplifier 120 goes high and presents a high state to the minus reference input of differential amplifier 98 which is higher than any voltage at the plus comparing input of differential amplifier 98, regardless of the position of potentiometer 102, whereby the output of differential amplifier 98 stays low and is disabled, and hence differential amplifier 52 is controlled solely by the tach voltage.

It is recognized that various equivalents, alternatives and modifications are possible within the scope of the appended claims.

I claim:

1. In an internal combustion engine having ignition timing means supplying ignition timing pulses according to a baseline timing curve as a function of engine speed, a timing circuit for stabilizing idling of said engine comprising:
    delay means for variably delaying said ignition timing pulses relative to a top dead center position of said engine to retard engine timing from said baseline curve;
    engine speed responsive means coupled to said delay means for varying the relative timing delay of said pulses according to engine speed;
    acceleration detection means comprising throttle position responsive means coupled to said delay means for decreasing said relative timing delay to advance engine timing for quick acceleration;
    engine temperature responsive means coupled to said delay means for decreasing said relative timing delay when engine temperature is below a given value; and
    disabling means coupled to said acceleration detection means and responsive to a second predetermined engine speed higher than said first mentioned predetermined speed and disabling said acceleration detection means at engine speeds above said second predetermined speed.

2. In an internal combustion engine having ignition timing means supplying ignition timing pulses according to a baseline timing curve as a function of engine speed for timed ignition relative to a top dead center position in a cycle of revolution of said engine, a timing circuit for stabilizing idling of said engine comprising:
    delay means comprising input and output comparator means, said input comparator means having a reference input connected to a node and having a comparison input connected to an RC timing circuit and receiving said ignition pulses, the leading edges of said pulses being delayed by said RC timing circuit, such that the output of said input comparator means transitions when the delayed comparison input voltage rises in a given polarity direction above a threshold value relative to the reference input voltage, said output comparator means having a reference input connected to said node and having a comparison input coupled to a second RC timing circuit and to the output of said input comparator means, the trailing edges of said pulses being delayed by said second RC timing circuit, such that the output of said output comparator means transitions when its delayed comparison input voltage rises in a given polarity direction above a threshold value relative to its reference input voltage, such that said comparators delay said ignition timing pulses relative to said top dead center position according to the reference voltage at said node, to retard engine timing from said baseline curve;
    engine speed responsive means comprising means outputting a voltage as a function of engine speed and differential amplifier means having a reference input from a reference voltage and having a comparison input receiving said speed responsive voltage and having an output connected to said node, such that the output of said differential amplifier means provides a high voltage at said node at engine speeds below a predetermined speed and rapidly decreases the voltage at said node in a given polarity direction at engine speeds above said predetermined speed, said high voltage at said node providing a high voltage at said reference inputs of said input and output comparator means which in turn require longer charging time of respective said first and second RC timing circuits until the respective comparison input voltages rise above a given threshold relative to the respective reference input voltages, whereby to delay said ignition pulses, said high voltage at said node being fixed for engine speeds below said predetermined speed such that said ignition pulses are delayed by a fixed absolute time interval up to said predetermined speed such that said fixed absolute time interval becomes a greater percentage of the time for the engine to complete a cycle of revolution as engine speed increases up to said predetermined speed, such that delay of said ignition timing pulses relative to said top dead center position increases with increasing engine speed up to said predetermined speed to increasingly retard engine timing from said baseline curve to a maximum delay at said predetermined speed, such that at speeds below said predetermined speed an increase in engine speed increases said relative timing delay and further retards engine timing which further retarded timing slows engine speed and hence provides self-stabilization, and such that at speeds below said predetermined speed a decrease in engine speed decreases said relative timing delay and advances engine timing which advanced timing increases engine speed and hence provides self-stabilization, and such that at engine speeds above said predetermined speed said rapidly decreasing voltage at said node decreases the voltage at said reference inputs of said input and output comparator means which reduces the requisite charging time for said first and second RC timing circuits until the respective comparison input voltages rise above said given threshold relative to the respective reference input voltages whereby to decrease the timing delay of said ignition pulses relative to said top dead center position, which relative timing delay decreases with increasing engine speed above said predetermined speed and advances engine timing to merge with said baseline curve.

3. The invention according to claim 2 comprising second differential amplifier means having a reference input from a reference voltage and having a comparison input connected to temperature sensitive means sensing engine temperature and connected to a voltage source, said second differential amplifier means having an output connected to said node, such that at engine temperatures below a given value, the voltage at said comparison input of said second differential amplifier means as controlled by said temperature sensitive means is greater than a given threshold value relative to the voltage at said reference input of said second differential amplifier means, and the output of said second differential amplifier means is low at said node to reduce said relative timing delay and advance engine timing, and such that at engine temperatures above said given value said temperature sensitive means decreases the voltage at said comparison input of said second differential amplifier means in a given polarity direction below said given threshold value relative to the voltage at said reference input at said second differential amplifier means such that the output of said second differential amplifier means transitions high at said node such that said relative timing delay is controlled by said first differential amplifier means.

4. The invention according to claim 3 comprising means supplying starting voltage during cranking of said engine to said comparison input of said second differential amplifier means such that said output of said second differential amplifier means at said node is low even if engine temperature is above said given value such that said relative timing delay is decreased and engine timing is advanced during cranking regardless of engine temperature.

5. The invention according to claim 3 comprising third differential amplifier means having a reference input from a reference voltage and having a comparison input connected to a throttle position sensor outputting a voltage as a function of throttle position, said third differential amplifier means having an output connected to said comparison input of said first differential amplifier means, such that movement of the throttle increases the voltage at said comparison input of said third differential amplifier means in a given polarity direction above a given threshold value relative to the voltage at said reference input at said third differential amplifier means such that said output of said third differential amplifier means transitions high which high state at said comparison input of said first differential amplifier means causes said output of said first differential amplifier means at said node to transition low to reduce said relative timing delay and advance engine timing to enable quick acceleration.

6. The invention according to claim 5 comprising fourth differential amplifier means having a reference input from a reference voltage and having a comparison input from said means outputting a voltage as a function of engine speed, said fourth differential amplifier means having an output connected to said reference input of said third differential amplifier means, such that at a second predetermined engine speed above said first mentioned predetermined engine speed the voltage at said comparison input of said fourth differential amplifier means as a function of engine speed rises in a given polarity direction above a given threshold value relative to the voltage at said reference input of said fourth differential amplifier means and said output of said fourth differential amplifier means increases which presents an increased voltage at said reference input of said third differential amplifier means and disables the latter's output from going high regardless of the voltage at said comparison input of said third differential amplifier means from said throttle position sensor means.

* * * * *